US006270085B1

(12) United States Patent
Chen et al.

(10) Patent No.: US 6,270,085 B1
(45) Date of Patent: Aug. 7, 2001

(54) CHUCK DEVICE FOR TOOL BITS

(76) Inventors: Tsai-Ching Chen, P.O. Box 63-247, Taichung (TW); Chiu-Man Chang-Kao, P.O. Box 63-247, taichung (TW)

( * ) Notice: Subject to any disclaimer, the term of this patent is extended or adjusted under 35 U.S.C. 154(b) by 0 days.

(21) Appl. No.: 09/410,536

(22) Filed: Oct. 1, 1999

(51) Int. Cl.[7] .................................................. B23B 31/107
(52) U.S. Cl. .............................. 279/22; 279/75; 279/155; 279/905
(58) Field of Search ................................. 279/22, 30, 74, 279/75, 155, 905

(56) References Cited

U.S. PATENT DOCUMENTS

| | | | |
|---|---|---|---|
| 1,119,276 | * 12/1914 | Griffith et al. | 279/75 |
| 1,516,257 | * 11/1924 | White | 279/74 |
| 2,135,861 | 11/1938 | Thompson . | |
| 3,788,658 | * 1/1974 | Benjamin et al. | 279/75 |
| 4,577,875 | * 3/1986 | Miyakawa | 279/75 |
| 4,692,073 | 9/1987 | Martindell . | |
| 4,850,758 | 7/1989 | Morgan . | |
| 4,900,202 | 2/1990 | Wienhold . | |
| 5,013,194 | 5/1991 | Wienhold . | |
| 5,062,749 | * 11/1991 | Sheets | 279/75 |
| 5,398,946 | * 3/1995 | Quiring | 279/30 |
| 5,452,906 | 9/1995 | Huff et al. . | |
| 5,476,273 | 12/1995 | Shadeck et al. . | |
| 6,199,872 | 3/2001 | Hasan . | |

FOREIGN PATENT DOCUMENTS

3324756 A1 1/1985 (DE) .

* cited by examiner

*Primary Examiner*—Steven C. Bishop
(74) *Attorney, Agent, or Firm*—Alan Kamrath; Rider, Bennett, Egan & Arundel, LLP

(57) ABSTRACT

A chuck device for a tool bit includes a spindle with a stub formed on an end thereof, a tube including a first section mounted around the stub of the spindle and a second section, a sliding sleeve slidably mounted around the tube, and a ball partially received in a transverse countersink in the second section of the tube. A first elastic member is mounted around the tube and attached between an outer shoulder of the tube and an inner shoulder of the sliding sleeve. A second elastic member includes a first end received in the stub and a second end in the tube. When the chuck device is in a condition not receiving a tool bit, the ball is moved out of the longitudinal hole of the tube and partially located in the annular groove of the sliding sleeve under the action of the second elastic member, and the first elastic member is in a compressed status. When a tool bit is inserted into the longitudinal hole of the tube to a position where an annular retaining groove of the tool bit aligns with the transverse countersink of the tube, the second elastic member is compressed, the second elastic member returns and thus causes the sliding sleeve to slide along a longitudinal direction of the tube, thereby moving the ball inward to partially engage with the annular retaining groove of the tool bit, thereby retaining the tool bit in place. When the sliding sleeve is slid along the longitudinal direction of the tube to the position where the annular groove of the sliding sleeve aligns with the transverse countersink of the tube, the second elastic member returns and thus ejects the tool bit in the longitudinal hole of the tube.

4 Claims, 11 Drawing Sheets

CHUCK DEVICE FOR TOOL BITS

BACKGROUND OF THE INVENTION

1. Field of the Invention

The present invention relates to a chuck device for tool bits, and more particularly to a chuck device for tool bits that allows a tool bit to be mounted to and removed from the chuck device by a single hand.

2. Description of the Related Art

FIGS. 11 and 12 of the drawings illustrates a conventional chuck device for tool bits of a pneumatic device that includes an outer cover 90 biased by a spring 93. When a tool bit 94 is inserted into the chuck device, the user has to use one hand to move the outer cover 90 downward (as viewed from FIG. 11) to move a ball 92 to a position engaging with an annular recess 95 in the tool bit 94. Then, the outer cover 90 is released and the spring 93 is returned to retain the ball 92 in place. Nevertheless, when the tool bit 94 and/or the chuck device is subjected to a shock, the ball 92 is apt to be moved into an annular groove 91 of the outer cover 90 under the action of the spring 93. The tool bit 94 is thus disengaged. The present invention is intended to provide a chuck device that mitigates and/or obviates the above problems.

SUMMARY OF THE INVENTION

It is a primary object of the present invention to provide an improved chuck device for tool bits that allows the tool bit to be mounted to and removed from the chuck device by a single hand.

In accordance with the present invention, a chuck device for a tool bit comprises:

a spindle with a stub formed on an end thereof, a compartment being defined in the stub;

a tube including a first section mounted around the stub of the spindle and a second section, the tube having an outer shoulder formed on an outer periphery thereof, the tube including a longitudinal hole, a transverse countersink being defined in the second section and communicated with the longitudinal hole of the tube;

a sliding sleeve slidably mounted around the tube, the sliding sleeve including an annular groove in an inner periphery thereof and an inner shoulder formed on the inner periphery thereof;

a ball partially received in the transverse countersink;

a first elastic means mounted around the tube and attached between the outer shoulder of the tube and the inner shoulder of the sliding sleeve; and a second elastic means including a first end received in the stub and a second end in the tube;

whereby when the chuck device is in a condition not receiving a tool bit, the ball is moved out of the longitudinal hole of the tube and partially located in the annular groove of the sliding sleeve under the action of the second elastic means, and the first elastic means is in a compressed status;

whereby when a tool bit having an annular retaining groove is inserted into the longitudinal hole of the tube to a position where the annular retaining groove of the tool bit aligns with the transverse countersink of the tube, the second elastic means is compressed, the second elastic means returns and thus causes the sliding sleeve to slide along a longitudinal direction of the tube, thereby moving the ball inward to partially engage with the annular retaining groove of the tool bit, thereby retaining the tool bit in place; and whereby when the sliding sleeve is slid along the longitudinal direction of the tube to the position where the annular groove of the sliding sleeve aligns with the transverse countersink of the tube, the second elastic means returns and thus ejects the tool bit in the longitudinal hole of the tube.

A bottom wall that defines the transverse countersink has a hole communicated with the longitudinal hole of the tube, whereby the ball is prevented from completely falling into the tube by the bottom wall yet allowing the ball to partially move into the tube.

In an embodiment of the invention, the second elastic means includes an elastic member and a follower. The follower includes a first section with a receptacle therein and a second section that moves the ball out of the longitudinal hole of the tube. The elastic member includes a first end received in the compartment of the stub and a second end received in the receptacle of the follower for biasing the second section of the follower to a position so as to move the ball out of the longitudinal hole of the tube.

The second section of the tube includes an inner shoulder. The follower includes an outer shoulder that bears against the inner shoulder of the second section of the tube when the second section of the follower is biased by the elastic member to the position for moving the ball out of the longitudinal hole of the tube.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
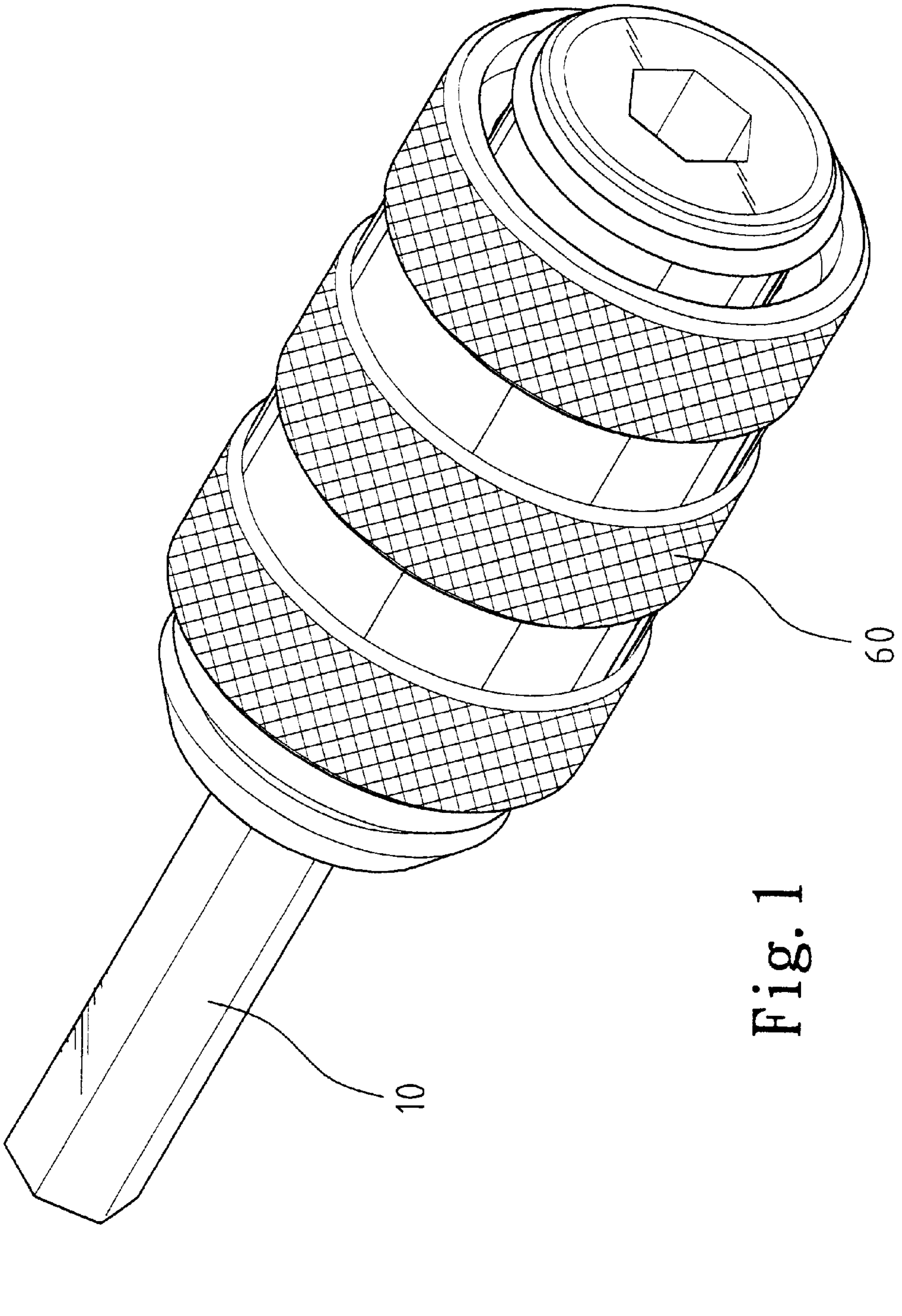
FIG. 1 is a perspective view of a chuck device in accordance with the present invention.
Figure 2:
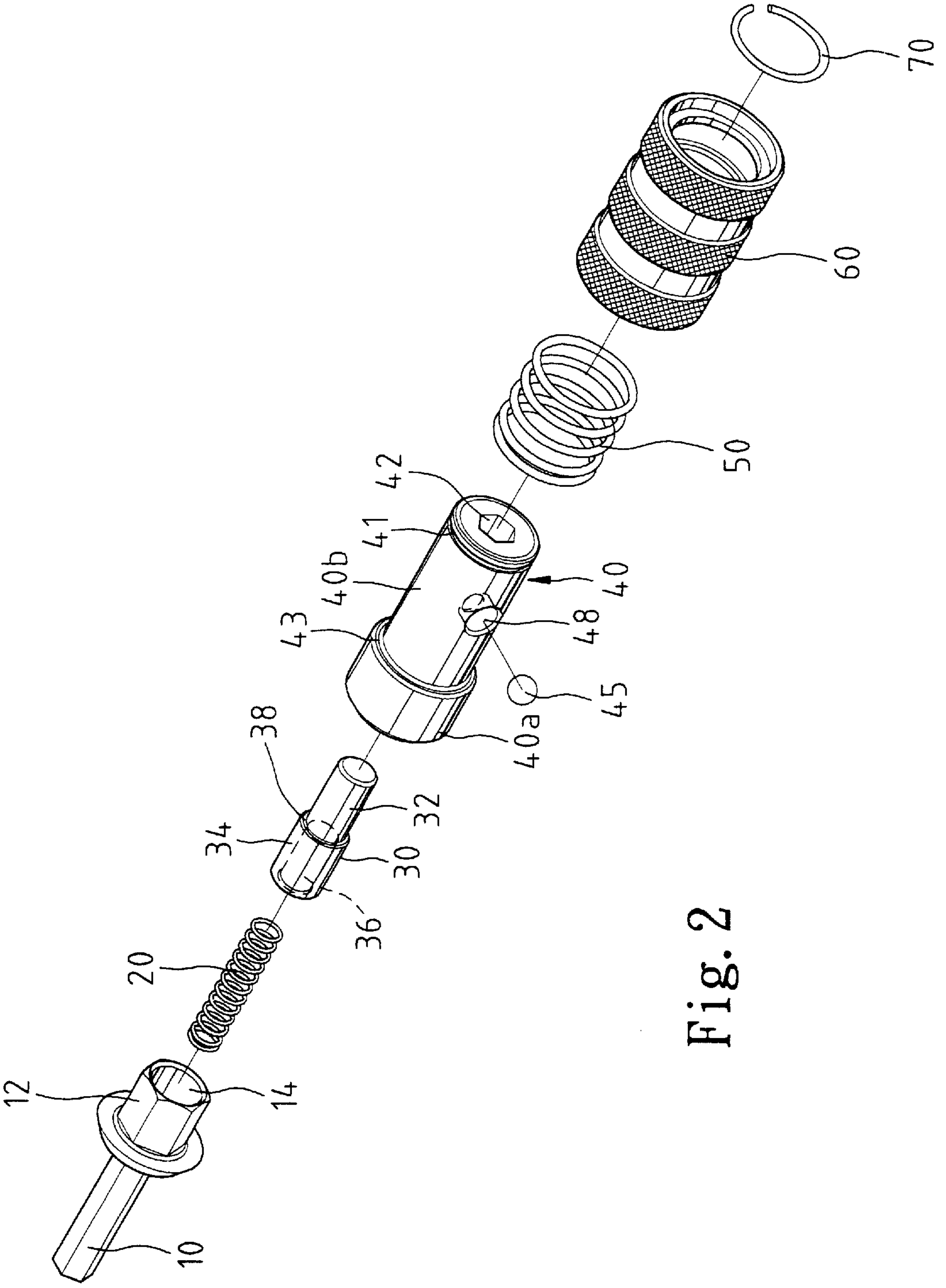
FIG. 2 is an exploded perspective view of the chuck device in accordance with the present invention.
Figure 3:
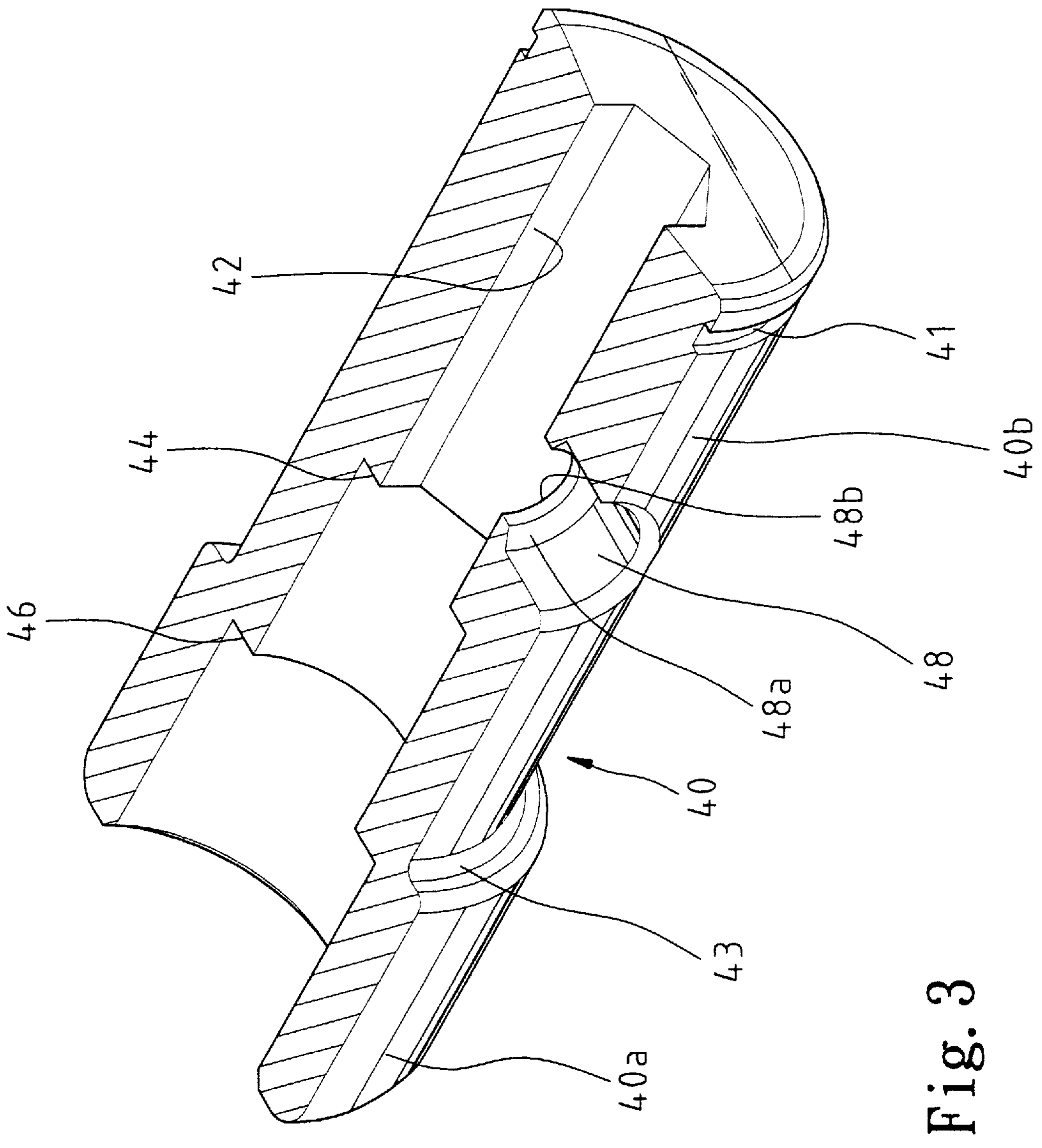
FIG. 3 is a cut-away perspective view of a tube of the chuck device in accordance with the present invention.
Figure 4:
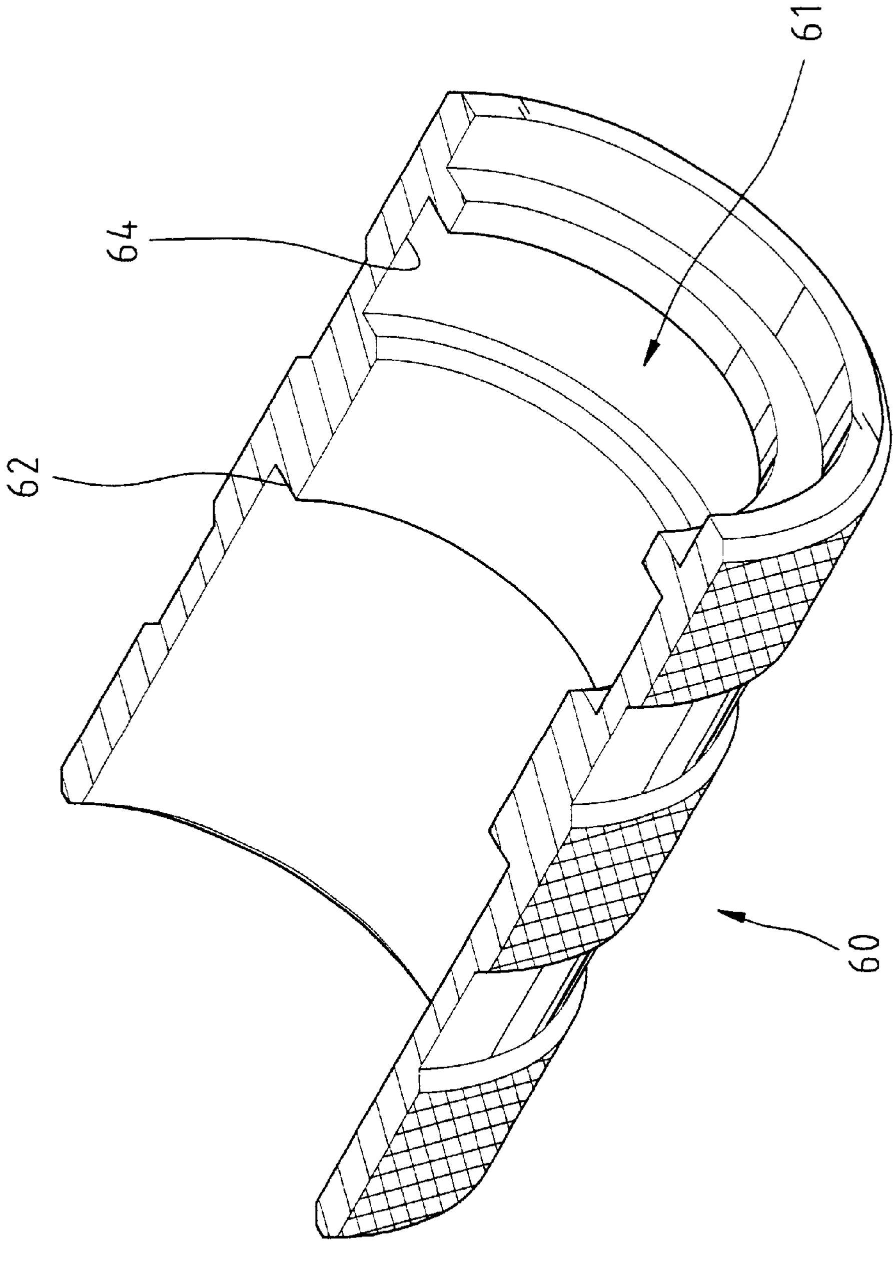
FIG. 4 is a cut-away perspective view of a sliding sleeve of the chuck device in accordance with the present invention.
Figure 5:
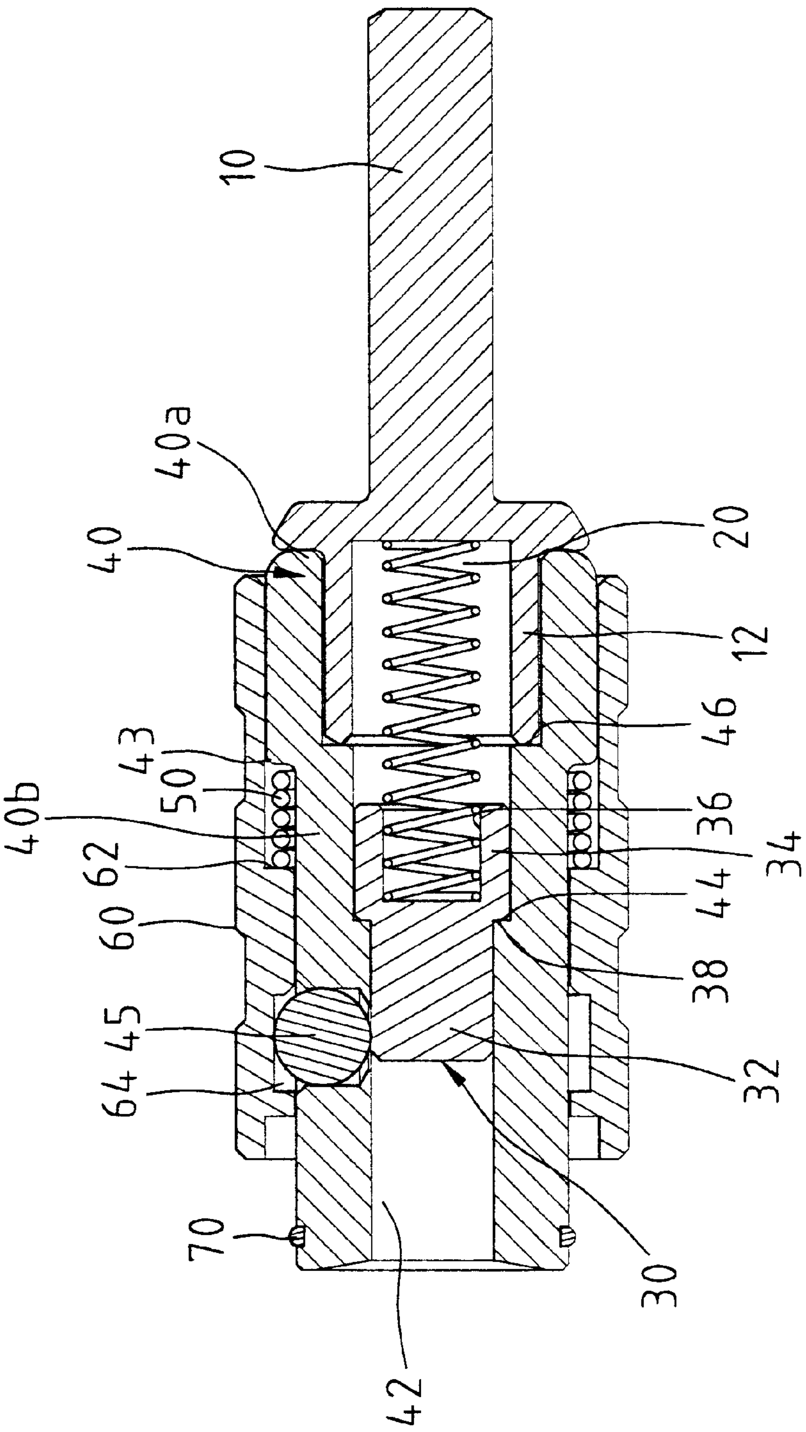
FIG. 5 is a sectional view of the chuck device in accordance with the present invention.

Referring to FIGS. 1 through 10 and initially to FIGS. 1, 2, and 5, a chuck device in accordance with the present invention generally includes a spindle 10, a follower 30, a tube 40, and a sliding sleeve 60. The spindle 10 may be attached to a handle (not shown) or a driving means (not shown) of a pneumatic or electric device (not shown).

The spindle 10 includes a stub 12 formed on an end thereof and having a compartment 14. Referring to FIGS. 2, 3, and 5, the tube 40 includes a first section 40*a* mounted around the stub 12 and a second section 40*b* having an outer diameter smaller than the first section 40*a*, thereby defining an outer shoulder 43 on an outer periphery of the tube 40. The tube 40 further includes a longitudinal hole 42 having two stepped sections, thereby defining two inner shoulders 44 and 46. In addition, a transverse countersink 48 is defined in the second section 40*b*, a bottom wall 48*a* defining the transverse countersink 48 having a hole 48*b* communicated with the longitudinal hole 42 of the tube 40.

Still referring to FIGS. 2 and 5, the follower 30 is mounted in the tube 40 and includes a first section 34, a second section 32, an outer shoulder 38 formed between the first section 34 and the second section 32, and a receptacle 36 defined in the first section 34. As illustrated in FIG. 5, the outer shoulder 38 of the follower 30 bears against the inner shoulder 44 of the tube 40 under the action of an elastic member 20 that is received in the compartment 14 of the spindle 10 and the receptacle 36 of the follower 30.

Referring to FIGS. 2, 4, and 5, the sliding sleeve 60 is slidably mounted around the tube 40 and includes a longitudinal bore 61, an annular groove 64 in an inner periphery thereof, and an inner shoulder 62 formed on the inner periphery thereof. As illustrated in FIG. 5, an elastic member 50 is mounted around the second section 40*b* of the tube 40 and attached between the inner shoulder 62 of the sliding sleeve 60 and an outer shoulder 43 of the tube 40. A ball 45 is received in the transverse countersink 48 of the tube 40 and biased inward by the inner periphery of the sliding sleeve 60 so as to partially protrude into the longitudinal hole 42 of the tube 40 under the action of the elastic member 50 when desired. A C-clip 70 is engaged in an annular groove 41 in the outer periphery of the tube 40 for preventing disengagement of the sliding sleeve 60 from the tube 40, best shown in FIG. 5.

Figure 6:
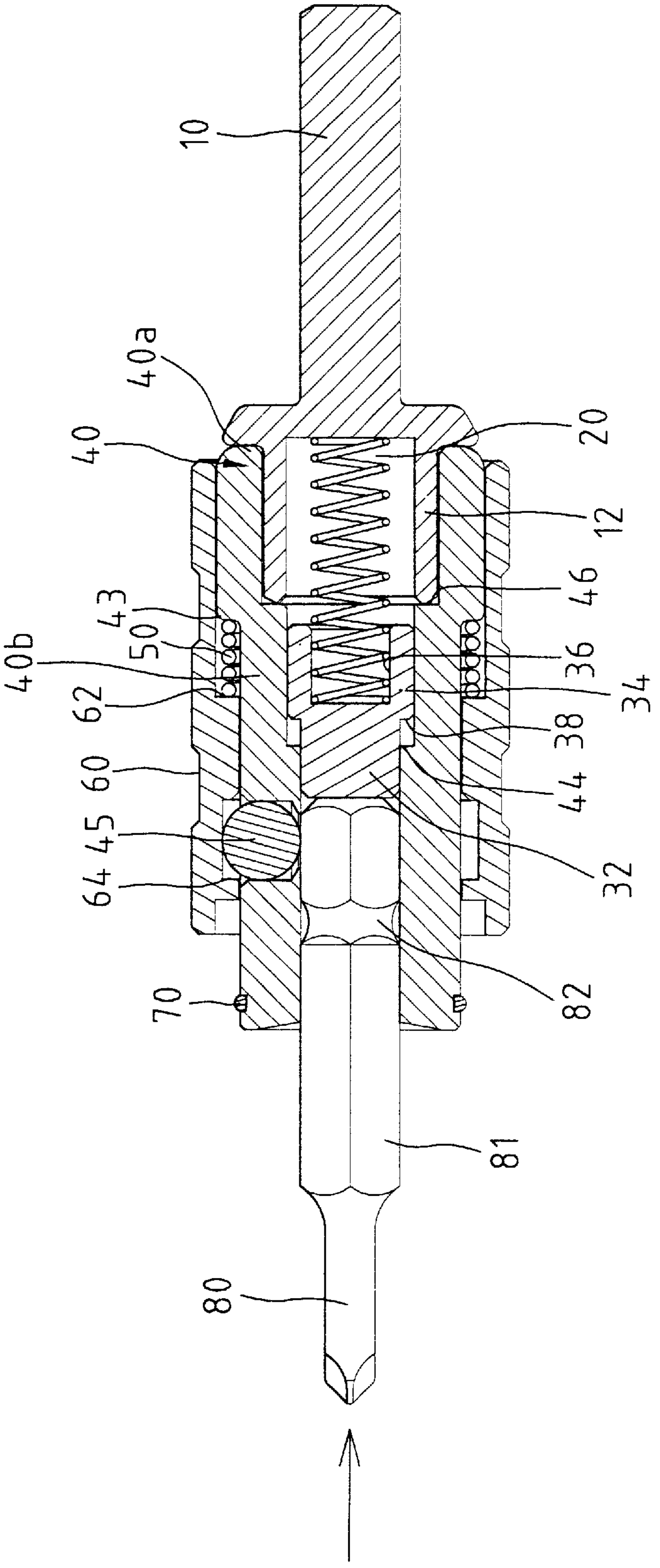
FIG. 6 is a sectional view illustrating insertion of a tool bit held into the chuck device.
Figure 7:
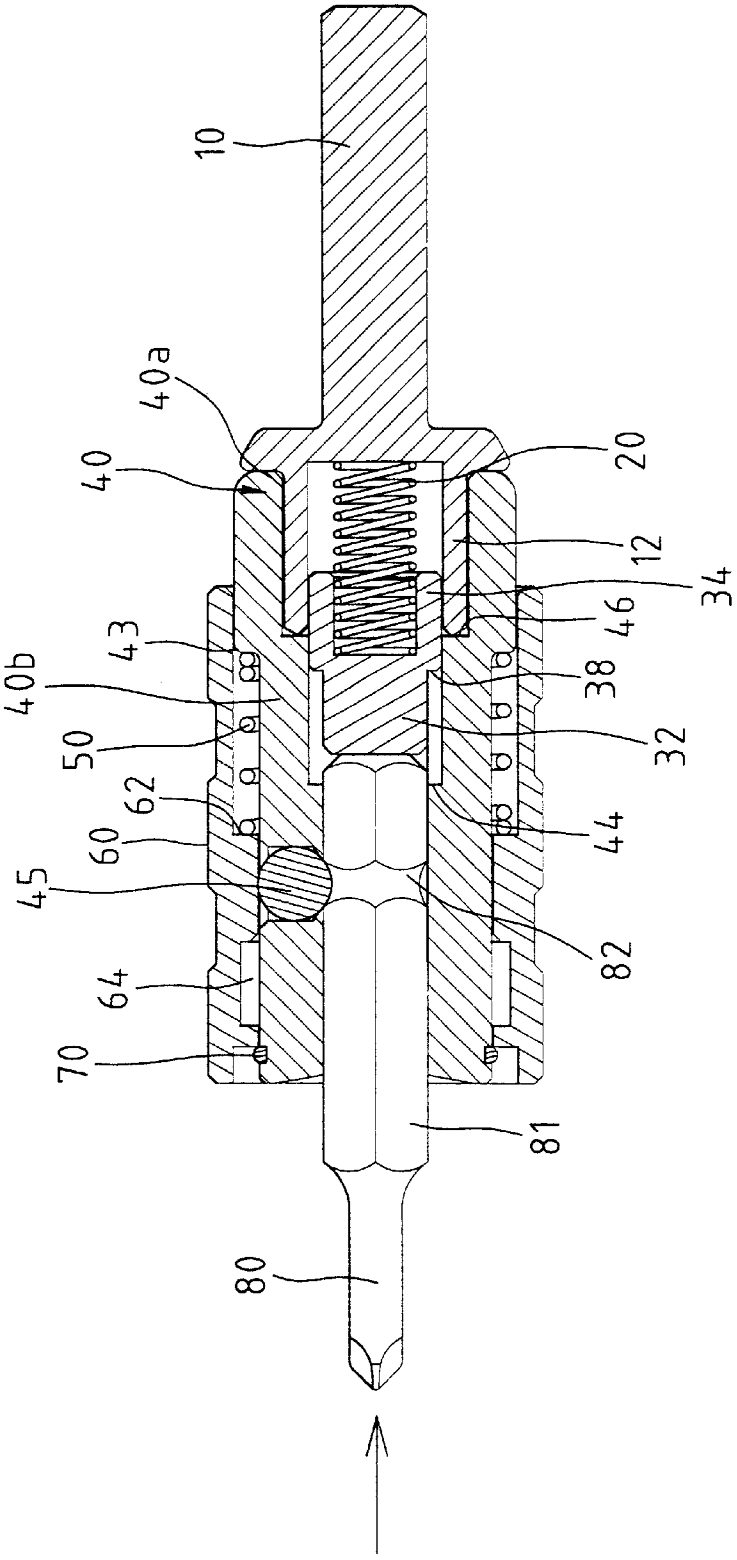
FIG. 7 is a sectional view similar to FIG. 6, wherein the tool bit has been inserted into the chuck device.
Figure 8:
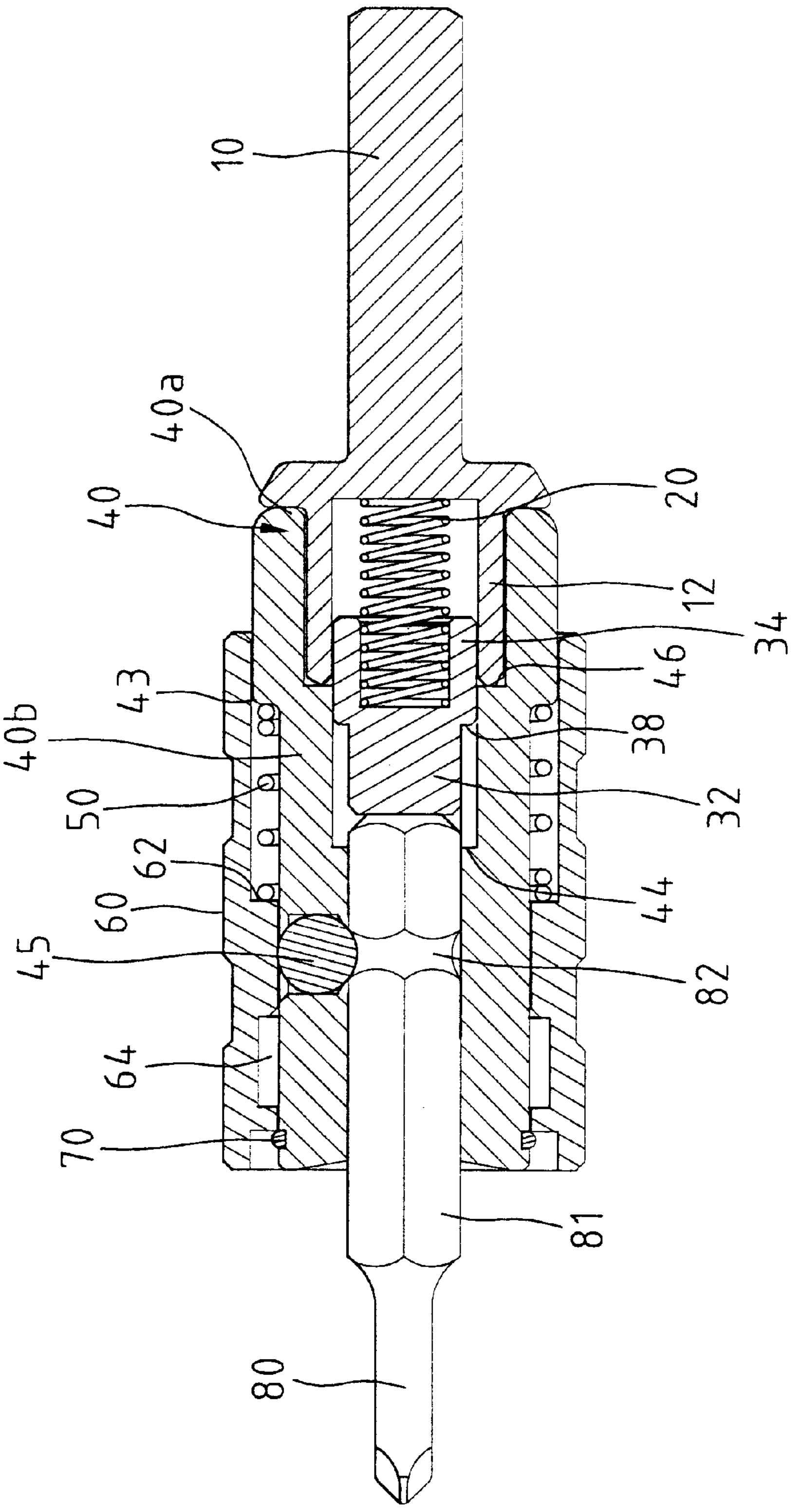
FIG. 8 is a sectional view similar to FIG. 7, wherein the tool bit is retained in place.

Referring to FIG. 5, the ball 45 is biased by the first section 34 of the follower 30 and thus partially protrudes into the annular groove 64 of the sliding sleeve 60. The elastic member 50 is compressed. Referring to FIG. 6, when inserting a tool bit 80 into the chuck device, the tool bit 80 is held by a user (with only one hand) and inserted into the longitudinal hole 42 of the tube 40 until an annular retaining groove 82 of a shank 81 of the tool bit 80 is aligned with the ball 45, as shown in FIG. 7. It is appreciated that the ball 45 is disengaged from the annular groove 64 of the sliding sleeve 60. In this status, the ball 45 is allowed to move inward under the action of the elastic member 50 that causes longitudinal sliding movement of the sliding sleeve 60, which, in turn, causes the inward movement of the ball 45. Thus, the tool bit 80 is retained in place by the ball 45 under the action of the elastic member 50, as shown in FIG. 8.

The elastic member 20 is compressed. It is appreciated that insertion of the tool bit 80 is accomplished by a single hand.

Figure 9:
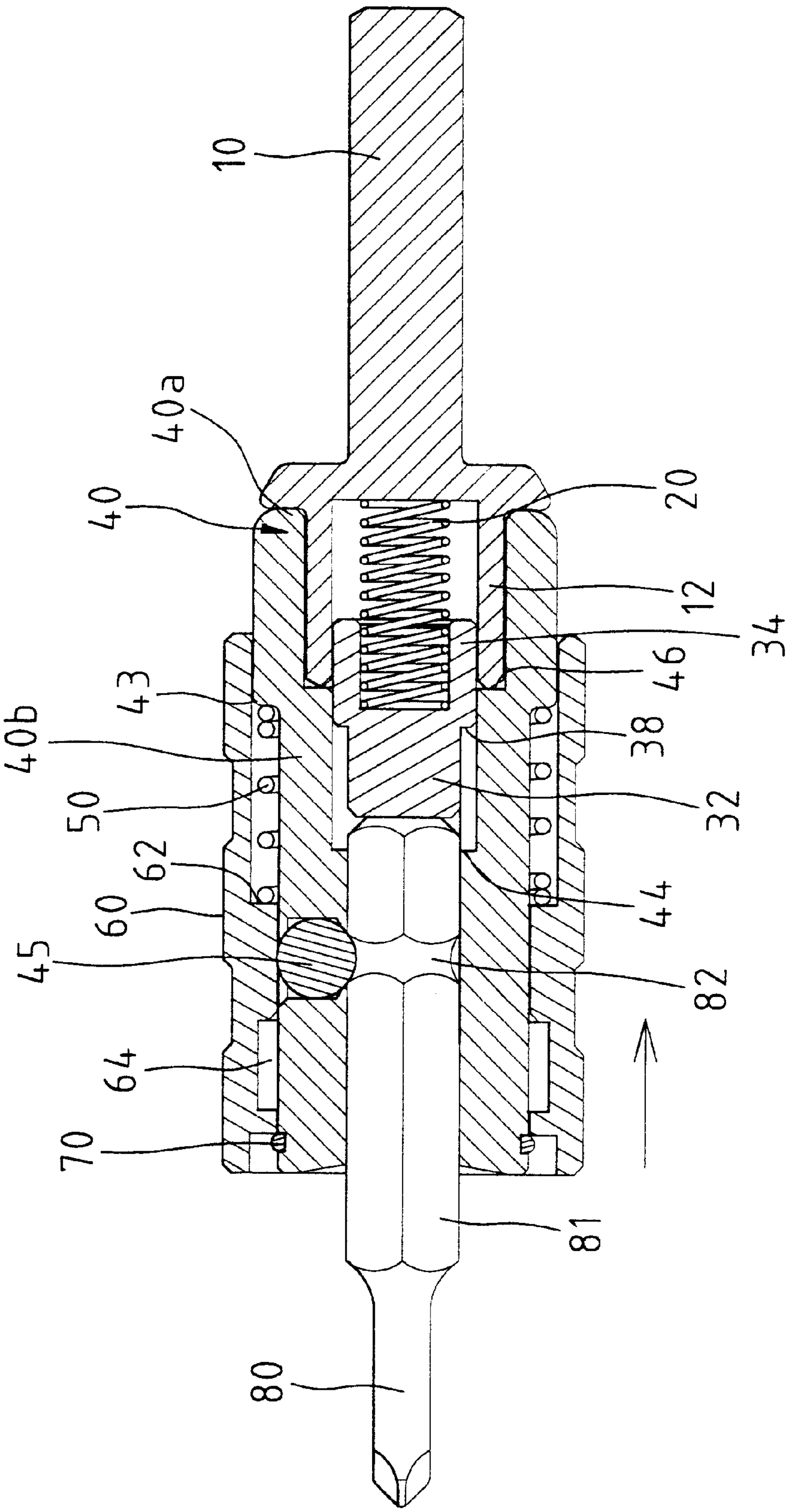
FIG. 9 is a sectional view illustrating removal of the tool bit from the chuck device.
Figure 10:
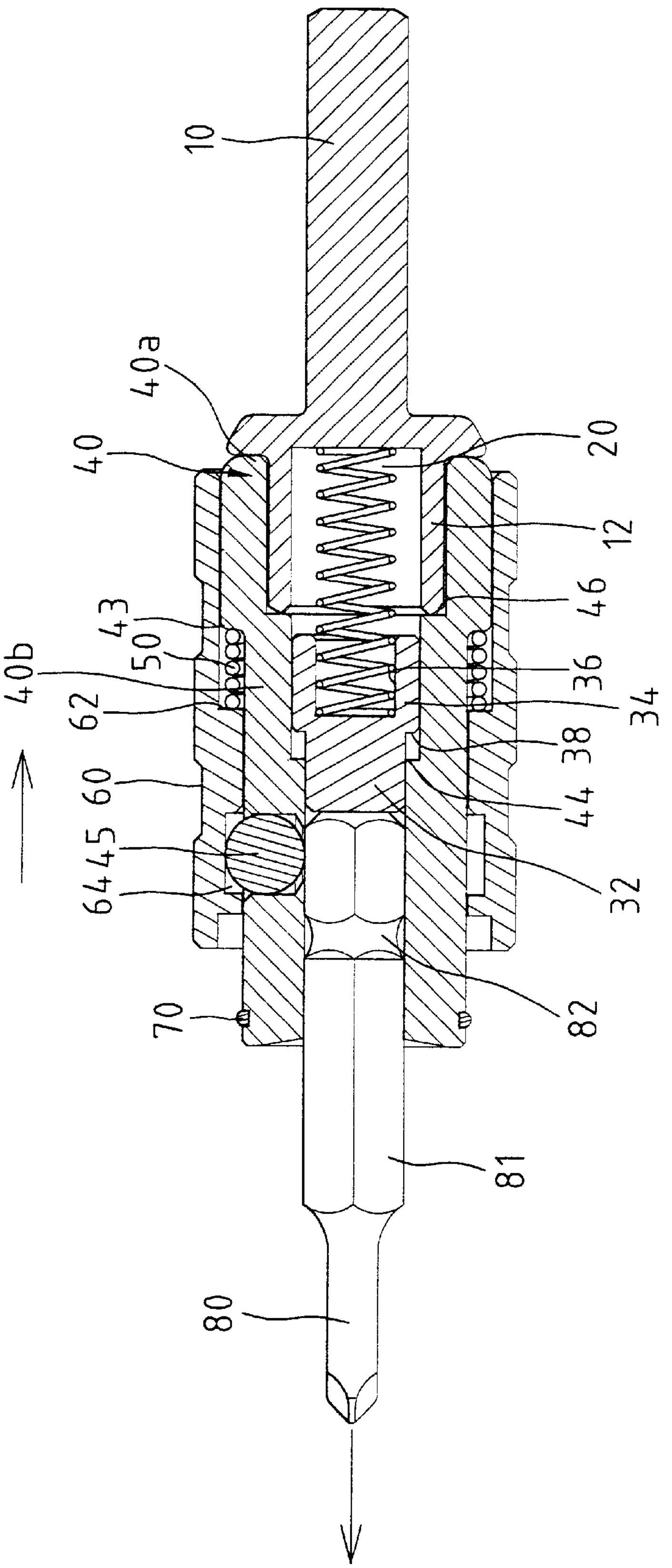
FIG. 10 is a sectional view similar to FIG. 9, wherein the tool bit is being ejected outward under the action of an elastic member.
Figure 12:
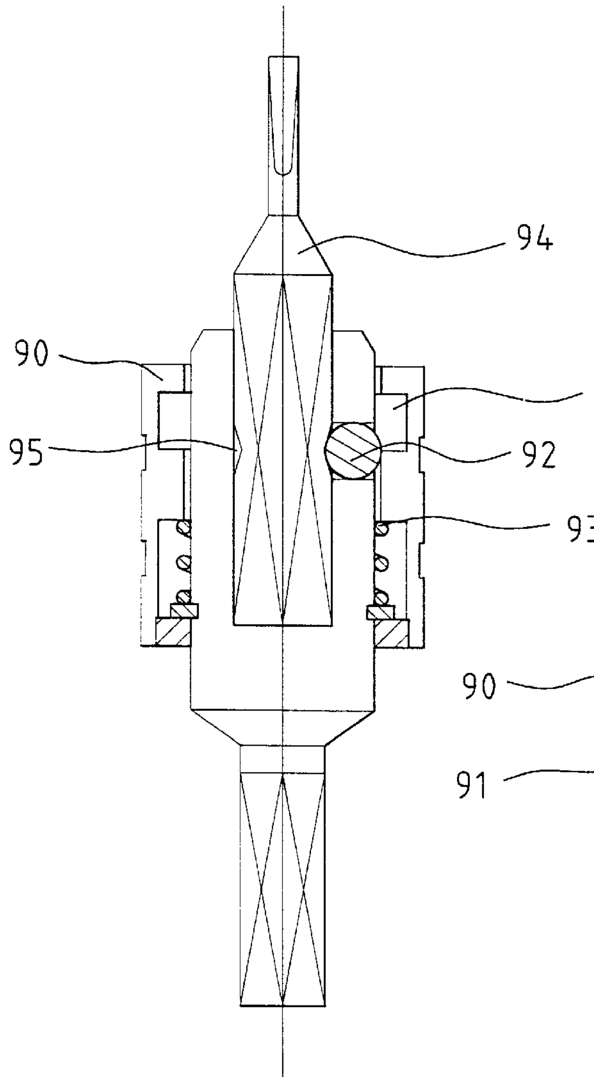
Fig. 12 PRIOR ART
FIG. 12 is a sectional view of the tool bit and the conventional chuck device in FIG. 4.
Figure 11:
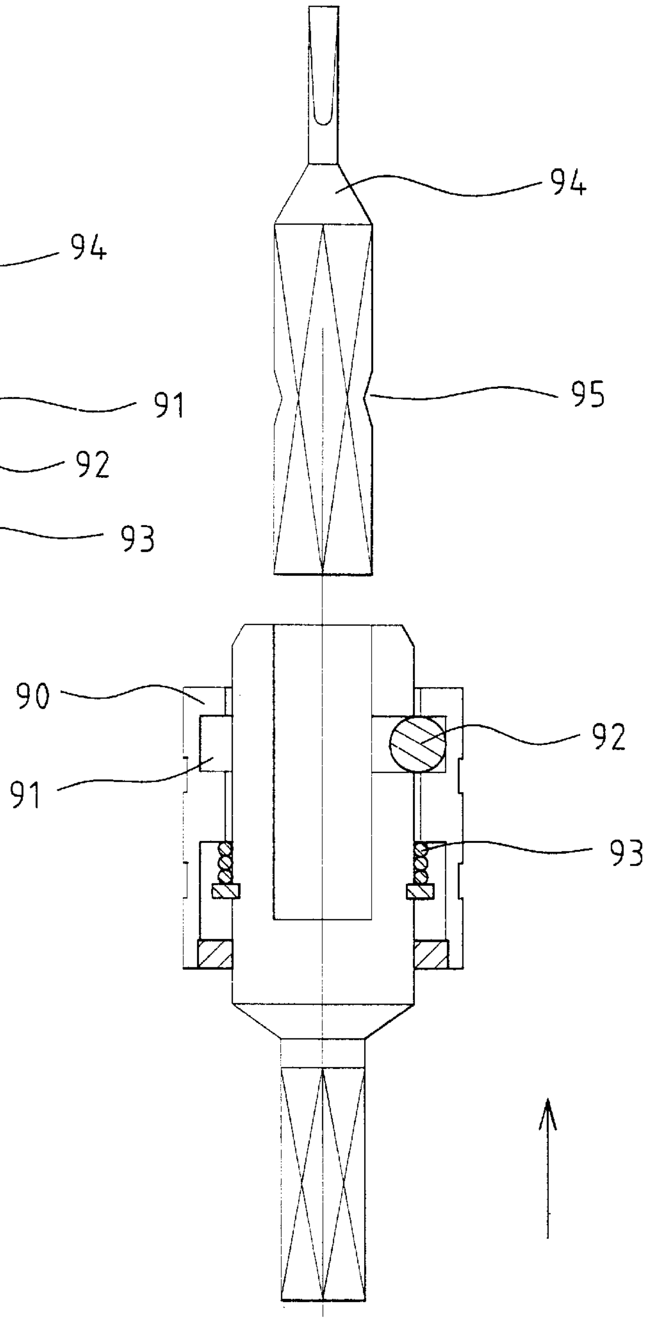
Fig. 11 PRIOR ART
FIG. 11 is a sectional view of a tool bit to be inserted into a conventional chuck device.

Referring to FIG. 9, when removing the tool bit 80 from the chuck device, the sliding sleeve 60 is moved away from the tool bit 80 (see the arrow) until the annular groove 64 of the sliding sleeve 60 is aligned with the ball 45, as shown in FIG. 10. In this status, returning movement of the elastic member 20 ejects the tool bit 80 outward, as the ball 45 is allowed to move into the annular groove 64. Thus, removal of the tool bit is accomplished by a single hand.

According to the above description, it is appreciated that mounting/removal of the tool bit 80 onto/from the chuck device can be conveniently accomplished by a single hand. In addition, it is noted that the follower 30 can be omitted, and an end of the elastic member 20 is made longer to directly urge the ball 45 outward.

Although the invention has been explained in relation to its preferred embodiment, it is to be understood that many other possible modifications and variations can be made without departing from the spirit and scope of the invention as hereinafter claimed.

What is claimed is:

1. A chuck device for a tool bit, the chuck device comprising:

a spindle with a stub formed on an end thereof, a compartment being defined in the stub;

a tube separate from the spindle, with the tube including a first section mounted around the stub of the spindle and a second section, the tube having an outer shoulder formed on an outer periphery thereof; the tube including a longitudinal hole, a transverse countersink being defined in the second section and communicated with the longitudinal hole of the tube, wherein the second section of the tube includes a first inner shoulder;

a sliding sleeve slidably mounted around the tube, with the sliding sleeve including an annular groove in an inner periphery thereof and an inner shoulder formed on the inner periphery thereof;

a ball partially received in the transverse countersink;

a first elastic means mounted around the tube and attached between the outer shoulder of the tube and the inner shoulder of the sliding sleeve;

an elastic member; and a follower, the follower including a first section with a receptacle therein and a second section of a size for slideable receipt in the longitudinal hole for abutting with and moving the ball out of the longitudinal hole of the tube, the elastic member including a first end received in the compartment of the stub and a second end received in the receptacle of the follower for biasing the second section of the follower to a position so as to move the ball out of the longitudinal hole of the tube, and wherein the follower includes an outer shoulder intermediate the first and second sections of the follower and of a size larger than the longitudinal hole for bearing against the first inner shoulder of the second section of the tube when the second section of the follower is biased by the elastic member to the position for moving the ball out of the longitudinal hole of the tube; whereby when the chuck device is in a condition not receiving a tool bit, the ball is moved out of the longitudinal hole of the tube and partially located in the annular groove of the sliding sleeve by the abutment with the second section of the follower under the action of the elastic member with the outer shoulder of the follower abutting with the first inner shoulder of the second section of the tube, and the first elastic means is in a compressed status;

whereby when a tool bit having an annular retaining groove is inserted into the longitudinal hole of the tube to a position where the annular retaining groove of the tool bit aligns with the transverse countersink of the tube, the elastic member is compressed and the outer shoulder of the follower is spaced from the first inner shoulder of the second section of the tube, the elastic member returns and thus causes the sliding sleeve to slide along a longitudinal direction of the tube, thereby moving the ball inward to partially engage with the annular retaining groove of the tool bit, thereby retaining the tool bit in place; and whereby when the sliding sleeve is slid along the longitudinal direction of the tube to the position where the annular groove of the sliding sleeve aligns with the transverse countersink of the tube, the elastic member returns and thus ejects the tool bit in the longitudinal hole of the tube.

2. The chuck device as claimed in claim 1 wherein the second section of the tube includes a second inner shoulder of a larger diameter than the first inner shoulder, and wherein the end of the spindle abuts with the second inner shoulder of the second section of the tube.

3. The chuck device as claimed in claim 2, wherein a bottom wall that defines the transverse countersink has a hole communicated with the longitudinal hole of the tube, whereby the ball is prevented from completely falling into the tube by the bottom wall yet allowing the ball to partially move into the tube.

4. The chuck device as claimed in claim 1, wherein a bottom wall that defines the transverse countersink has a hole communicated with the longitudinal hole of the tube, whereby the ball is prevented from completely falling into the tube by the bottom wall yet allowing the ball to partially move into the tube.

* * * * *